US012612982B2

(12) United States Patent
Soliman et al.

(10) Patent No.: US 12,612,982 B2
(45) Date of Patent: Apr. 28, 2026

(54) PIPE FOR TRANSPORT OF CHLORINATED WATER

(71) Applicant: SABIC GLOBAL TECHNOLOGIES B.V., Bergen op Zoom (NL)

(72) Inventors: Maria Soliman, Geleen (NL); Ajay Kumar Taraiya, Geleen (NL); Peter Degenhart, Geleen (NL); Mark Johannes Boerakker, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/606,477

(22) PCT Filed: Apr. 30, 2020

(86) PCT No.: PCT/EP2020/062070
§ 371 (c)(1),
(2) Date: Oct. 26, 2021

(87) PCT Pub. No.: WO2020/221876
PCT Pub. Date: Nov. 5, 2020

(65) Prior Publication Data
US 2022/0196187 A1 Jun. 23, 2022

(30) Foreign Application Priority Data

May 2, 2019 (EP) ..................................... 19172226

(51) Int. Cl.
| | |
|---|---|
| *F16L 9/127* | (2006.01) |
| *B29C 55/00* | (2006.01) |
| *B29C 55/26* | (2006.01) |
| *B29K 23/00* | (2006.01) |
| *B29L 23/00* | (2006.01) |
| *C02F 1/76* | (2023.01) |
| *C08L 23/06* | (2006.01) |

(52) U.S. Cl.
CPC ............ *F16L 9/127* (2013.01); *B29C 55/005* (2013.01); *B29C 55/26* (2013.01); *C08L 23/06* (2013.01); *B29K 2023/065* (2013.01); *B29L 2023/22* (2013.01); *C02F 1/76* (2013.01); *C02F 2303/04* (2013.01); *C08L 2203/18* (2013.01); *C08L 2207/068* (2013.01)

(58) Field of Classification Search
None
See application file for complete search history.

(56) References Cited

U.S. PATENT DOCUMENTS

| | | | |
|---|---|---|---|
| 6,325,959 B1 | 12/2001 | Ek et al. | |
| 2012/0118390 A1* | 5/2012 | Piel | B29C 48/09 |
| | | | 137/1 |
| 2014/0127438 A1* | 5/2014 | Sherman, Jr. | C08K 5/526 |
| | | | 428/36.9 |
| 2015/0211673 A1* | 7/2015 | Jan | F16L 57/02 |
| | | | 428/36.9 |

FOREIGN PATENT DOCUMENTS

| | | | | |
|---|---|---|---|---|
| JP | H05212770 | A | * | 8/1993 |
| JP | 2014043518 | A | * | 3/2014 |
| WO | 9319924 | A1 | | 10/1993 |
| WO | 9719807 | A1 | | 6/1997 |
| WO | 2005056657 | A2 | | 6/2005 |
| WO | 2007003530 | A1 | | 1/2007 |
| WO | 2012019969 | A1 | | 2/2012 |
| WO | 2015162155 | A1 | | 10/2015 |
| WO | 2016142803 | A1 | | 9/2016 |
| WO | 2017133918 | A1 | | 8/2017 |
| WO | 2018028921 | A1 | | 2/2018 |

OTHER PUBLICATIONS

"PE 100 Pipe systems" Second edition, edited by Heiner Brömstrup (2004), pp. 51-62.
Alt et al., "Bimodal Polyethylene—Interplay of Catalyst and Process," Macromol. Symp. 2001, vol. 163, pp. 135-143.
Colin et al., "Aging of Polyethylene Pipes Transporting Drinking Water Disinfected by Chlorine Dioxide. I. Chemical Aspects", Polymer Engineering and Science (2009) 1429-1437.
International Search Report; International Application No. PCT/EP2020/062070; International Filing Date: Apr. 30, 2020; Date of Mailing: Jul. 13, 2020; 3 pages.
PE 100 Pipe Systems, second edition, Heiner Bromstrup (editor), 2004, pp. 16-20 ISBN 3-8027-2728-2.
Peacock "Handbook of Polyethylene: Structures, Properties, and Applications" Marcel Dekker, Inc. New York, 2000, pp. 1-66.
Written Opinion; International Application No. PCT/EP2020/062070; International Filing Date: Apr. 30, 2020; Date of Mailing: Jul. 13, 2020; 5 pages.

* cited by examiner

*Primary Examiner* — Thomas J Kessler
(74) *Attorney, Agent, or Firm* — CANTOR COLBURN LLP

(57) ABSTRACT
The invention relates to use of a pipe for transporting chlorinated water, wherein the pipe is a biaxially oriented pipe made by a process comprising the steps of: a) forming a polymer composition comprising a polyolefin into a tube and b) stretching the tube of step a) in the axial direction and in the peripheral direction to obtain the biaxially oriented pipe.

10 Claims, No Drawings

PIPE FOR TRANSPORT OF CHLORINATED WATER

CROSS REFERENCE TO RELATED APPLICATIONS

This application is a National Stage application of PCT/EP2020/062070, filed Apr. 30, 2020, which claims the benefit of European Application No. 19172226.3, filed May 2, 2019, both of which are incorporated by reference in their entirety herein.

The present invention relates to use of a pipe produced with a polymer composition comprising a polyolefin for the transport of chlorinated water. The pipe has an improved resistance to chlorine-containing disinfectants.

Pipes for the transport of gas, for sanitation and for water supply may be produced with for example bimodal polyethylene and polypropylene compositions. Pipes have a very good resistance to water however their lifetime is shortened when the pipes come into contact with disinfectants which are often added to water for hygienic reasons. The chlorine dioxide used as disinfectant in water degrades most materials including polyethylene (Colin, Aging of polyethylene pipes transporting drinking water disinfected by chlorine dioxide, part I, Chemical aspects; Polymer engineering and Science 49(7); 1429-1437; July 2009). Other chlorinated solvents are for example chloramine and chlorine.

It is known in the art to apply additives for example antioxidants and stabilizers to prevent said degradation. Several types of additives are proposed to protect polymers during processing and to achieve the desired end-use properties. WO 2005/056657 discloses a pipe comprising polyethylene for use with chlorinated water that contains hindered phenols such as Irganox 1330, Irganox 1010 and/or Irganox 1076 and phosphites such as Irgafos 168 and metal deactivators such as Irganox MD 1024 and/or Naugard™ XL1. According to this solution, appropriate combinations of stabilizers have to be carefully selected, depending on the desired final properties the polymeric article should have.

WO2017133918 discloses a drinking water pipe produced with a polymer composition comprising polyethylene and zinc sulphide.

WO2018/028921 discloses a pipe for the transport of water produced with a polymer composition comprising polyethylene and polyolefin elastomer wherein the amount of polyolefin elastomer in the composition is lower than 10.0 wt % relative to the total weight of the composition.

There is still a need in the art for a method for transporting chlorinated water through a pipe with a high resistance to chlorine-containing disinfectants.

Accordingly, the present invention provides use of a pipe for transporting chlorinated water, wherein the pipe is a biaxially oriented pipe made by a process comprising the steps of:
   a) forming a polymer composition comprising a polyolefin into a tube, and
   b) stretching the tube of step a) in the axial direction and in the peripheral direction to obtain the biaxially oriented pipe.

It was surprisingly found that a biaxially oriented polyolefin pipe has a high resistance to chlorine-containing disinfectants.

According to a further aspect, the present invention provides use of a biaxially oriented pipe for improving the resistance of a pipe against chlorinated water, wherein the biaxially oriented pipe is made by a process comprising the steps of:

a) forming a polymer composition comprising a polyolefin into a tube, and
   b) stretching the tube of step a) in the axial direction and in the peripheral direction to obtain the biaxially oriented pipe.

The term "chlorinated water" is herein understood to mean water dosed with chlorine, chlorine dioxide and/or chloramines. The total amount of chlorine, chlorine dioxide and chloramines may be 0.01 to 4.0 ppm by weight with respect to the chlorinated water. In some embodiments, the amount of chlorine dioxide is 0.01 to 4.0 ppm by weight with respect to the chlorinated water.

The terms "pipe" and "tube" are herein understood as a hollow elongated article, which may have a cross section of various shapes. The cross section may e.g. be circular, elliptical, square, rectangular or triangular. The term "diameter" is herein understood as the largest dimension of the cross section.

A biaxially oriented pipe and its production method are per-se well-known and are described e.g. in WO1993019924 and U.S. Pat. No. 6,325,959, incorporated herein by reference.

Polymer Composition

Preferably, the polymer composition comprising a polyolefin essentially comprises no further polymers other than the polyolefin. The amount of the polyolefin with respect to the total amount of polymers in the polymer composition may be at least 95 wt %, at least 98 wt %, at least 99 wt % or 100 wt %.

Preferably, the polyolefin in the polymer composition is selected from polypropylene and polyethylene and a combination of polypropylene and polyethylene. More preferably, the polyolefin in the polymer composition comprises polyethylene.

In some embodiments, the polymer composition essentially comprises no further polymers other than polyethylene. The amount of polyethylene with respect to the total amount of polymers in the polymer composition may be at least 95 wt %, at least 98 wt %, at least 99 wt % or 100 wt %.

Preferably, the polyolefin in the polymer composition is selected from the group consisting of high density polyolefin (HDPE), linear low-density polyethylene (LLDPE), low-density polyethylene (LDPE) and ultrahigh molecular weight polyethylene (UHMwPE). More preferably, the polyolefin in the polymer composition comprises HDPE.

In some embodiments, the polyolefin comprises HDPE and a further polyethylene other than HDPE. The further polyethylene may e.g. be linear low-density polyethylene (LLDPE), low-density polyethylene (LDPE) or a combination of LLDPE and LDPE. Preferably, the further polyethylene is LLDPE or a combination of LLDPE and LDPE. More preferably, the further polyethylene is LLDPE. In case the further polyethylene is a combination of LLDPE and LDPE, the weight ratio of LLDPE to LDPE may e.g. be at least 0.1, for example at least 0.2 or at least 0.3 and at most 10, for example at most 5 or at most 3. Preferably, the weight ratio of LLDPE to LDPE is at least 1, for example 2 to 10. Preferably, the weight ratio of HDPE to the further polyethylene in the polymer composition is more than 1, preferably 1.2-5, for example 1.5-4 or 2-3.

In some embodiments, the polymer composition essentially comprises no further polymers other than HDPE. The amount of HDPE with respect to the total amount of polymers in the polymer composition may be at least 95 wt %, at least 98 wt %, at least 99 wt % or 100 wt %.

The polymer composition may comprise components other than polyolefin, such as additives and fillers.

Examples of the additives include nucleating agents; stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; and/or components that enhance interfacial bonding between polymer and filler, such as a maleated polyethylene. The amount of the additives is typically 0 to 5 wt %, for example 1 to 3 wt %, with respect to the total composition.

Examples of fillers include glass fibers, talc, mica, nanoclay. The amount of fillers is typically 0 to 40 wt %, for example 5 to 30 wt % or 10 to 25 wt %, with respect to the total composition.

Accordingly, in some embodiments, the polymer composition further comprises 0 to 5 wt % of additives and 0 to 40 wt % of fillers.

The polymer composition may be obtained by melt-mixing the polyolefin with any other optional components.

Preferably, the total amount of the polyolefin and the optional additives and the optional fillers is 100 wt % with respect to the total composition.

In some embodiments, the total amount of HDPE and the optional further polyethylene with respect to the total amount of polymers present in the polymer composition is at least 95 wt %, at least 98 wt %, at least 99 wt % or 100 wt %.

In some embodiments, the total amount of HDPE and the optional further polyethylene with respect to the total composition is at least 90 wt %, at least 95 wt %, at least 98 wt %, at least 99 wt % or 100 wt %.

Preferably, the polymer composition has a Melt Flow Rate of 0.1-4 g/10 min, more preferably 0.1-1 g/10 min, measured according to ISO1133-1:2011 (190° C./5 kg).

The production processes of HDPE, LLDPE and LDPE are summarised in Handbook of Polyethylene by Andrew Peacock (2000; Dekker; ISBN 0824795466) at pages 43-66. HDPE Preferably, the HDPE is bimodal or multimodal. Such HDPEs have properties suitable for producing a pipe. Furthermore, such HDPEs can be drawn at a low draw ratio without causing the localized reduction in cross-sectional area known as polymer necking.

It is understood that a bimodal HDPE has a molecular weight distribution having two peaks corresponding to the first median and the second median of the respective stages in the polymerization. It is similarly understood that a multimodal HDPE has a molecular weight distribution having multiple peaks corresponding to the first median, the second median and one or more further medians of the respective stages in the polymerization.

HDPE may be an ethylene homopolymer or may comprise a comonomer, for example butene or hexene.

Preferably, the HDPE has a density of 940-960 kg/m³, more preferably 940-955 kg/m³, measured according to ISO1183.

Preferably, the HDPE has a Melt Flow Rate of 0.1-4 g/10 min, more preferably 0.1-1 g/10 min, measured according to ISO1133-1:2011 (190° C./5 kg).

In some embodiments, the polymer composition comprises a compound comprising the HDPE and a colorant, wherein the compound has a density of 947-965 kg/m³ measured according to ISO1183. The colorant may e.g. be carbon black or a pigment having a color of e.g. black, blue or orange. The amount of the colorant is typically 1-5 wt %, more typically 2-2.5 wt %, with respect to the compound comprising the HDPE and the colorant, the rest typically being the HDPE.

The HDPE can be produced by using low pressure polymerisation processes. For example, pipe materials of the performance class PE 80 and PE 100 are known, which are generally produced in cascade plants by a so called bimodal or multimodal process. The production processes for bimodal HDPE are summarised at pages 16-20 of "PE 100 Pipe systems" (edited by Bromstrup; second edition, ISBN 3-8027-2728-2). Suitable low pressure processes are slurry cascade of stirred reactors, slurry cascade of loop reactors and a combination of different processes such as slurry loop gas phase reactor. It is also possible to use a multimodal polyethylene, preferably trimodal polyethylene, as described for example in WO2007003530, as high density polyethylene pipe material.

The performance classes PE 80 and PE 100 are discussed at pages 35-42 of "PE 100 Pipe systems" (edited by Bromstrup; second edition, ISBN 3-8027-2728-2). The quality test methods are described at pages 51-62 of "PE 100 Pipe systems".

The production of bimodal high density polyethylene (HDPE) via a low pressure slurry process is described by Alt et al. in "Bimodal polyethylene-Interplay of catalyst and process" (Macromol. Symp. 2001, 163, 135-143). In a two stage cascade process the reactors may be fed continuously with a mixture of monomers, hydrogen, catalyst/co-catalyst and hexane recycled from the process. In the reactors, polymerisation of ethylene occurs as an exothermic reaction at pressures in the range between for example 0.5 MPa (5 bar) and 1 MPa (10 bar) and at temperatures in the range between for example 75° C. and 85° C. The heat from the polymerisation reaction is removed by means of cooling water. The characteristics of the polyethylene are determined amongst others by the catalyst system and by the applied concentrations of catalyst, co monomer and hydrogen.

The concept of the two stage cascade process is elucidated at pages 137-138 by Alt et al. "Bimodal polyethylene-Interplay of catalyst and process" (Macromol. Symp. 2001, 163). The reactors are set up in cascade with different conditions in each reactor including low hydrogen content in the second reactor. This allows for the production of HDPE with a bimodal molecular mass distribution and defined co monomer content in the polyethylene chains in each reactor.

A trimodal HDPE suitable for use in the present invention may be produced by a three stage cascade process. The three stage cascade process corresponds to a process wherein one additional reactor is added to the two stage cascade process as described above. The additional reactor is fed with a mixture of monomers, hydrogen, catalyst/co-catalyst and hexane recycled from the process, similar to the reactors used in the two stage cascade process.

Examples of the HDPE include a bimodal PE 80, a bimodal PE 100 and a multimodal HDPE. PE 80 is a PE material with an MRS (minimum required strength after 50 years for water at 20 degrees Celsius) of 8 MPa and PE 100 is a PE material with an MRS of 10 MPa. The pipe classification is elucidated at page 35 of "PE 100 Pipe systems" (edited by Bromstrup; second edition, ISBN 3-8027-2728-2).

Preferably, the HDPE or the compound comprising the HDPE and the colorant has one or more of, preferably all of, the following characteristics:

Tensile modulus of 500-1400 MPa, preferably 700-1200 MPa (according to ISO 527-2)

Yield stress of 15-32 MPa, preferably 18-28 MPa (according to ISO 527-2)

Full Notch Creep Test (FNCT): 100-20000 h (according to ISO 16770 @ 80 degrees centigrade/4 MPa)

notched Charpy impact value of 10-40 kJ/m² @ 23° C., preferably 14-35 kJ/m² (according to ISO 1 eA).

LLDPE

The polymer composition may comprise LLDPE.

The technologies suitable for the LLDPE manufacture include gas-phase fluidized-bed polymerization, polymerization in solution, polymerization in a polymer melt under very high ethylene pressure, and slurry polymerization.

The LLDPE comprises ethylene and a C3-C10 alpha-olefin comonomer (ethylene-alpha olefin copolymer). Suitable alpha-olefin comonomers include 1-butene, 1-hexene, 4-methyl pentene and 1-octene. The preferred co monomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the LLDPE has a density of 900-948 kg/m³, more preferably 915-935 kg/m³, more preferably 920-935 kg/m³, determined according to ISO1872-2.

Preferably, the LLDPE has a Melt Flow Rate of 0.1-3.0 g/10 min, more preferably 0.3-3.0 g/10 min, determined according to ISO1133-1:2011 (190° C./2.16 kg).

LDPE

The polymer composition may comprise LDPE.

The LDPE may be produced by use of autoclave high pressure technology and by tubular reactor technology.

LDPE may be an ethylene homopolymer or may comprise a comonomer, for example butene or hexene.

Preferably, the LDPE has a density of 916-940 kg/m³, more preferably 920-935 kg/m³, determined according to ISO1872-2.

Preferably, the LDPE has a Melt Flow Rate of 0.1-3.0 g/10 min, more preferably 0.3-3.0 g/10 min, determined according to ISO1133-1:2011 (190° C./2.16 kg).

UHMwPE

The polymer composition may comprise UHMwPE. UHMwPE is a substantially linear polyethylene which has a relative viscosity of 1.44 or greater, at a concentration of 0.02%, at 135° C., in decahydronaphthalene. UHMwPE is described further in ASTM D4020 2011.z Crosslinking Crosslinking of a polyolefin is known e.g. from WO97/19807 and WO2015/162155. WO97/19807, p. 10, I.25-p. 11, I.11 mentions radiation cross-linking, peroxide cross-linking, cross-linking with cross-linkable groups, ionomer cross-linking. WO2015/162155 mentions PEX-a process using peroxide under the influence of heat and high pressure ("Engel Method") in [0004], PEX-b process using moisture and heat in [0005], PEX-c process using high energy electron beam irradiation as in [0006] of WO2015/162155 and UV curing in [0007].

The degree of crosslinking can be quantified in accordance with the following citation from ASTM F876:

"6.8. Degree of Crosslinking

When tested in accordance with 7.9, the degree of crosslinking for PEX tubing material shall be within the range from 65 to 89% inclusive.

Depending on the process used, the following minimum percentages crosslinking values shall be achieved: 70% by peroxides (PEX-a), 65% by Azo compounds, 65% by electron beam (PEX-c), or 65% by silane compounds (PEX-b)."

Preferably, the polyolefin in the polymer composition is a substantially non-crosslinked polyolefin. The term "substantially non-crosslinked polyolefin" may mean a polyolefin having a degree of crosslinking as measured according to ASTM F876 of less than 50%, less than 40%, less than 30%, less than 20%, less than 10% or less than 5%.

The term "substantially non-crosslinked polyolefin" may mean a polyolefin which has not been subjected to the crosslinking methods described in WO97/19807, p. 10, I.25-p. 11, I.11 and WO2015/162155 [0004]-[0007].

It is advantageous that the pipe can be made by a simple process when the polyolefin in the polymer composition is a substantially non-crosslinked polyolefin.

Process Steps

The process for making the pipe may be performed as a continuous process or a batch-wise process. A continuous process is herein understood as a process wherein the polymer composition is continuously fed for the tube making step a), while the drawing step b) is continuously performed.

The polymer composition may be formed into a tube (step a) by any known method, such as extrusion or injection moulding. The biaxial elongation (step b) may be performed by any known method.

Methods for forming the polymer composition into a tube and the biaxial elongation of the tube are described in U.S. Pat. No. 6,325,959:

A conventional plant for extrusion of plastic pipes comprises an extruder, a nozzle, a calibrating device, cooling equipment, a pulling device, and a device for cutting or for coiling-up the pipe. By the molten mass of polymer on its way from the extruder through the nozzle and up to calibration, cooling and finished pipe being subjected to shear and elongation etc. in the axial direction of the pipe, an essentially uniaxial orientation of the pipe in its axial direction will be obtained. A further reason that contributes to the orientation of the polymer material in the direction of material flow is that the pipe can be subjected to tension in connection with the manufacture.

To achieve biaxial orientation, this plant can be supplemented, downstream of the pulling device, with a device for temperature control of the pipe to a temperature that is suitable for biaxial orientation of the pipe, an orienting device, a calibrating device, a cooling device, and a pulling device which supplies the biaxially oriented pipe to a cutting device or coiler.

The biaxial orientation can also be carried out in direct connection with the first calibration after extrusion, in which case the above-described supplementary equipment succeeds the first calibrating device.

The biaxial orientation of the pipe can be carried out in various ways, for instance mechanically by means of an internal mandrel, or by an internal pressurised fluid, such as air or water or the like. A further method is the orienting of the pipe by means of rollers, for instance by arranging the pipe on a mandrel and rotating the mandrel and the pipe relative to one or more pressure rollers engaging the pipe, or via internally arranged pressure rollers that are rotated relative to the pipe against an externally arranged mould or calibrating device.

Conditions for Step b)

The skilled person can select suitable conditions such as temperatures for step b) to obtain a biaxially oriented pipe. Step b) is performed at a drawing temperature which results in orientation of the polyolefin in the polymer composition.

The drawing temperature is selected to be lower than the melting point of the polyolefin in the polymer composition.

When the polyolefin composition comprises one type of polyolefin, step b) is preferably performed at a drawing temperature which is 1 to 30° C. lower than the melting point of the polyolefin in the polymer composition, for example 2 to 20° C. or 3 to 10° C. lower than the melting point of the polyolefin in the polymer composition.

When the polymer composition comprises different polyolefins having different melting points, the drawing temperature may be determined such that orientation of majority of the polyolefins is achieved. The skilled person can suitably determine the suitable drawing temperature depending on the types and the amounts of the polyolefins present in the polymer composition. Generally, it is possible to select the drawing temperature to be within a temperature range which is 1 to 30° C. lower than the melting point of each of the polyolefins present in the polymer composition, which drawing temperature does not exceed the lowest melting point of the polyolefins present in the polymer composition. In case the differences in the melting points of the polyolefins present in the polymer composition are very large, the drawing temperature may be selected based on the polyolefin which is present in a major amount. For example, the drawing temperature may be selected to be 1 to 30° C. lower than the melting point of the polyolefin which is present at a highest amount in the polymer composition. In determining the drawing temperature, it is also possible to ignore a polymer which is present in a small amount, e.g. less than 5 wt % of the polymer composition.

In some embodiments, the polyolefin in the polymer composition is HDPE and step b) may be performed at a drawing temperature which is 1 to 30° C. lower than the melting point of the HDPE, for example 2 to 20° C. or 3 to 10° C. lower than the melting point of the HDPE.

In some embodiments, step b) is performed at a drawing temperature of 115 to 125° C., preferably 115 to 123° C. This is particularly suitable when the polyolefin in the polymer composition is HDPE.

In some embodiments, the polyolefin in the polymer composition is polypropylene and step b) may be performed at a drawing temperature which is 1 to 30° C. lower than the melting point of the polypropylene, for example 2 to 20° C. or 3 to 10° C. lower than the melting point of the polypropylene.

In some embodiments, step b) is performed at a drawing temperature of 145 to 155° C. This is particularly suitable when the polyolefin in the polymer composition is polypropylene.

In some embodiments, the polyolefin in the polymer composition comprises HDPE at an amount of at least 50 wt %, at least 75 wt % or at least 90 wt % with respect to the polymer composition and step b) is performed at a drawing temperature which is 1 to 30° C. lower than the melting point of the HDPE, for example 2 to 20° C. or 3 to 10° C. lower than the melting point of the HDPE.

In some embodiments, the polyolefin in the polymer composition comprises polypropylene an amount of at least 50 wt %, at least 75 wt % or at least 90 wt % with respect to the polymer composition and step b) is performed at a drawing temperature which is 1 to 30° C. lower than the melting point of the polypropylene, for example 2 to 20° C. or 3 to 10° C. lower than the melting point of the polypropylene.

Draw Ratios

Typically, step b) is performed at an axial draw ratio of 1.1 to 5.0 and an average hoop draw ratio of 1.1 to 3.0.

Preferably, the average hoop draw ratio of 1.1 to 2.0.

Preferably, the axial draw ratio of 1.1 to 4.0, for example 1.1 to 3.6 or 1.1 to 3.2. The axial draw ratio is typically larger for obtaining a biaxially oriented pipe with a higher outer diameter.

In some embodiments, the polyolefin in the polymer composition is a bimodal or a multimodal HDPE and
    step b) is performed at an axial draw ratio of 1.1 to 3.2 and an average hoop draw ratio of 1.1 to 2.0 and the obtained biaxially oriented pipe has an outer diameter of at least 60 mm and a wall thickness of at least 5.5 mm or
    step b) is performed at an axial draw ratio of 1.1 to 1.9 and an average hoop draw ratio of 1.1 to 2.0 and the obtained biaxially oriented pipe has an outer diameter of less than 60 mm.

The use of a bimodal or a multimodal HDPE in combination with these specific draw ratios selected depending on the size of the outer diameter allows a stable, neck-free production of a pipe having a good resistance to crack property. In these embodiments, for obtaining a biaxially oriented pipe having an outer diameter of at least 60 mm, the axial draw ratio is selected to be 1.1 to 3.2 and an average hoop draw ratio is selected to be 1.1 to 2.0. The wall thickness is at least 5.5 mm. Preferably, the axial draw ratio is at least 1.2, at least 1.3, at least 1.5 or at least 1.8 and/or at most 3.0, at most 2.8 or at most 2.5. Preferably, the average hoop draw ratio is at least 1.2 or at least 1.3 and/or at most 1.8 or at most 1.6. Preferably, the outer diameter is 60 mm to 2000 mm, for example 60 mm to 150 mm or 150 mm to 2000 mm. Preferably, the wall thickness is 5.5 mm to 100 mm, for example 5.5 to 15 mm or 15 mm to 100 mm. In some embodiments, the biaxially oriented pipe according to the present invention has an outer diameter of 60 mm to 150 mm and a wall thickness of 5.5 to 15 mm.

In these embodiments, for obtaining a biaxially oriented pipe having an outer diameter of less than 60 mm, the axial draw ratio is selected to be 1.1 to 1.9 and an average hoop draw ratio is selected to be 1.1 to 2.0. Preferably, the axial draw ratio is at least 1.2, at least 1.3 or at least 1.5 and/or at most 1.8 or at most 1.7. Preferably, the average hoop draw ratio is at least 1.2 or at least 1.3 and/or at most 1.8 or at most 1.6. Preferably, the outer diameter is 10 mm to less than 60 mm, for example 10 mm to 40 mm or 40 mm to less than 60 mm. Preferably, the wall thickness is 1 mm to 10 mm, for example 1.5 mm to 5 mm. In some embodiments, the biaxially oriented pipe according to the present invention has an outer diameter of 10 mm to 40 mm and a wall thickness of 1.5 mm to 5 mm.

The axial draw ratio of the drawn pipe is defined as the ratio of the cross-sectional area of the starting isotropic tube to that of the biaxially oriented pipe (i.e. product), that is, $$\lambda_{axial} = \frac{(\text{Tube } OD)^2 - (\text{Tube } ID)^2}{(\text{Product } OD)^2 - (\text{Product } ID)^2}$$

OD stands for outer diameter and ID stands for inner diameter.

The average hoop draw ratio can be defined as:

$$\lambda_{average\ hoop} = \frac{\text{Total Draw Ratio } \lambda_{Total}}{\text{Axial Draw Ratio } \lambda_{axial}}$$

Where

-continued $$\lambda_{Total} = \frac{\text{Tube Wall Thickness}}{\text{Product Wall Thickness}}$$

The relatively low draw ratios were surprisingly found to improve the time-to-failure property.

Biaxially Oriented Pipe

Examples of suitable biaxially oriented pipes for use according to the invention have the following outer diameter and inner diameter and wall thickness.

| Outer diameter (mm) | Inner diameter (mm) | Wall thickness (mm) |
|---|---|---|
| 110 | 90 | 10.0 |
| 90 | 73.6 | 8.2 |
| 75 | 61.4 | 6.8 |
| 63 | 51.4 | 5.8 |
| 32 | 26 | 3.0 |

The present invention further provides a method for transporting chlorinated water through a biaxially oriented pipe made by a process comprising the steps of:

a) forming a polymer composition comprising a polyolefin into a tube and b) stretching the tube of step a) in the axial direction and in the peripheral direction to obtain the biaxially oriented pipe.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

HDPE: SABIC grade Vestolen A 6060R having a density of 959 kg/m³ (black compound density) and MFR 5 kg/190° C. of 0.3 g/10 minutes. Bimodal PE.

Production of Biaxially Oriented Pipe:

HDPE was made into granules using a twin screw extruder. Processing temperature and screw profile were of standard polyethylene compounding.

These compounded granules were used to produce thick tubular profiles of approximate dimensions of an outer diameter of about 60 mm and an inner diameter of about 24 mm. These thick tubes were drawn over an expanding conical mandrel of exit diameter of 61-65 mm and semi angle 15 degree at temperature of 120° C. at a draw speed of 100 mm/min. Axial draw ratio was varied as summarized in Table 1 and the average hoop draw ratio was 1.4.

ClO₂ Resistance Test

A circulation loop was used for water which contains ClO₂. The concentration of ClO₂ in the water was 1.0±0.1 ppm. The pH of the water was 6.8±0.2. The temperature of the water was 40±1° C. The flow volume was 54 l/h and a fluid pressure was 6 bar. Typical free pipe length was 500 mm, the outer diameter of the pipe was 63 mm and the thickness of the wall was based on the draw ratio of the pipe and shown in Table 1. The circulation loop used for ClO₂ testing was made from inert materials to avoid contamination of the test fluid. The internal environment is the above-mentioned solution of ClO₂ in water and the external environment is air. The testing set up is the same as for ASTM F2023.

TABLE 1

| Sample<br>PE100 | | Wall<br>thickness<br>(mm) | Stress<br>(MPa) | Results |
|---|---|---|---|---|
| CEx 1 | Isotropic | 6 | 2.8 | Failed after 13871 h |
| CEx 2 | Isotropic | 6 | 2.8 | Failed after 13407 h |
| Ex 3 | Biaxially oriented Axial 3.6 × Av Hoop 1.4 | 3.5 | 5.36 | No fail after 26331 h |
| Ex 4 | Biaxially oriented Axial 1.9 × Av Hoop 1.4 | 6.5 | 2.75 | No fail after 26331 h |
| Ex 5 | Biaxially oriented Axial 1.49 × Av Hoop 1.4 | 6.5 | 2.75 | No fail after 26331 h |

The inner surface of biaxially oriented pipes remained unaffected after 26331 h while the inner surface of isotropic pipe developed many cracks and ultimately failed after 13871 h or 13407 h.

The invention claimed is:

1. A pipe for transporting chlorinated water, wherein the pipe is a biaxially oriented pipe made by a process comprising:

a) forming a polymer composition comprising a polyolefin into a tube, and b) stretching the tube of step a) in the axial direction at an axial draw ratio of 1.49 to 3.6 and in the peripheral direction at an average hoop draw ratio of 1.2 to 1.6 to obtain a biaxially oriented pipe;

wherein the biaxially oriented pipe has a wall thickness of 3.0 to 10.0 mm and improved resistance to chlorinated water compared to the same pipe that has not been biaxially oriented, wherein:

the improved resistance is resistance to crack formation on the inner surface of the pipe;

the chlorinated water is water dosed with chlorine, chlorine dioxide and/or chloramines;

the total amount of chlorine, chlorine dioxide and chloramines is 0.01 to 4.0 ppm by weight with respect to the chlorinated water; and the amount of chlorine dioxide is 0.01 to 4.0 ppm by weight with respect to the chlorinated water; and wherein the polymer composition comprises pipe grade PE100 high density polyethylene (HDPE) having:

a minimum required strength (MRS) of 10 MPa, measured according to ISO 12162:2009 (E);

a bimodal or multimodal molecular weight distribution;

a density of 940 to 960 kg/m³, measured according to ISO1183; and a Melt Flow Rate of 0.1 to 1 g/10 min measured according to ISO1133-1:2011 (190° C./5 kg).

2. The pipe according to claim 1, wherein the polyolefin in the polymer composition is a substantially non-cross-linked polyolefin having a degree of crosslinking as measured according to ASTM F876 of less than 5%.

3. The pipe according to claim 1, wherein the polyolefin further comprises a polyolefin selected from the group consisting of linear low-density polyethylene (LLDPE), low-density polyethylene (LDPE), ultrahigh molecular weight polyethylene (UHMwPE) and combinations of at least two of the foregoing.

4. The pipe according to claim 1, wherein the polyolefin further comprises polypropylene.

5. The pipe according to claim 1, wherein the amount of the polyolefin with respect to the total amount of polymers in the polymer composition is at least 95 wt. %.

6. The pipe according to claim 1, wherein the polymer composition further comprises 0 to 5 wt % of additives and 0 to 40 wt % of fillers.

7. The pipe according to claim 1, wherein step b) is performed at a drawing temperature which is 1 to 30° C.

lower than the melting point of the polyolefin which is present at a highest amount in the polymer composition and/or wherein step b) is performed at a drawing temperature of 115 to 125° C.

8. The pipe according to claim 1, wherein:

the average hoop draw ratio is about 1.4; and the polyolefin has a density of about 959 kg/m³ and a Melt Flow Rate of about 0.3 g/10 min measured according to ISO1133-1:2011 (190° C./5 kg).

9. The pipe according to claim 8, wherein the pipe is resistant to failure for at least 26331 h when exposed to water containing 1.0±1 ppm of chlorine dioxide, and having a pH of 6.8±0.2, a temperature of 40±1° C., a flow volume of 54 1/h, and a fluid pressure of 6 bar, as measured according to ASTM F2023-08.

10. The pipe according to claim 1, wherein the pipe is resistant to failure for at least 26331 h when exposed to water containing 1.0±1 ppm of chlorine dioxide, and having a pH of 6.8±0.2, a temperature of 40±1° C., a flow volume of 54 1/h, and a fluid pressure of 6 bar, as measured according to ASTM F2023-08.

* * * * *